Patented Feb. 12, 1924.

1,483,739

UNITED STATES PATENT OFFICE.

KARL MARX, OF DESSAU, GERMANY, ASSIGNOR TO THE FIRM TETRALIN GESELLSCHAFT MIT BESCHRÄNKTER HAFTUNG, OF BERLIN, GERMANY.

TURPENTINE SUBSTITUTE.

No Drawing.  Application filed August 2, 1921.  Serial No. 489,257.

*To all whom it may concern:*

Be it known that I, KARL MARX, a citizen of the Republic of Germany, residing at Dessau, Germany, have invented certain new and useful Improvements in Turpentine Substitutes, of which the following is a specification.

My invention relates to a substitute for oil of turpentine and particularly to a substitute suitable for use in shoe polishes or pastes.

In a large number of industries oil of turpentine has been used to a great extent as a solvent or diluent. For example, it has been used for this purpose in the preparation of oil colors, colorings for shoe leather, shoe polishes, shoe glazes, etc. Similarly it has been used in very large quantities in the preparation of shoe pastes. Various substitutes have been sought in place of turpentine for this class of products, especially in view of its present high price and scarcity.

I have now discovered that fluid hydrogenated naphthalene is particularly well adapted for use as a solvent or diluent in the manufacture of many products in which oil of turpentine has hitherto been employed. Thus, a shoe paste can be made by partially or wholly substituting 1.2.3.4-tetrahydronaphthalene for the oil of turpentine hitherto used, and the said product possesses valuable differentiating characteristics. For example, such new shoe paste has the novel merit that no oxidation action or acidification takes place,—a characteristic which is very valuable as it protects the leather from becoming hard, as it does ordinarily as a result of the oxidation of oil of turpentine.

Similarly, oil colors can be made in which, in place of the usual mixture of eighty (80) parts linseed oil and twenty (20) parts turpentine oil, is substituted a mixture of a like quantity of linseed oil and a similar quantity of tetrahydronaphthalene (instead of turpentine oil). Into this mixture is worked, as usual, any suitable coloring material, such as permanent red B. extra, together with barium sulphate or white zinc. An oil color so made may be used in the same manner as the usual article, and its drying qualities are as good as those of the oil colors hitherto used.

A liquid shoe polish is readily prepared by dissolving say forty (40) parts colophony in say one hundred (100) parts tetrahydronaphthalene.

In place of 1.2.3.4-tetrahydronaphthalene may be substituted other fluid hydrogenated naphthalenes having similar solvent properties.

I claim—

1. A product comprising hydrogenated naphthalene as a solvent or diluent.

2. A product comprising a mixture of turpentine and hydrogenated napthalene as a solvent or diluent.

3. As a new industrial product, coloring material comprising hydrogenated naphthalene.

In testimony whereof I have signed my name to this specification.

KARL MARX.